US010065560B2

(12) United States Patent
Fleurence et al.

(10) Patent No.: US 10,065,560 B2
(45) Date of Patent: Sep. 4, 2018

(54) DEVICE FOR LIGHTING THE PASSENGER COMPARTMENT OF A MOTOR VEHICLE

(71) Applicant: VALEO VISION, Bobigny (FR)

(72) Inventors: Thierry Fleurence, Bobigny (FR); Aymeric Koniec, Bobigny (FR)

(73) Assignee: VALEO VISION, Bobigny (FR)

( * ) Notice: Subject to any disclaimer, the term of this patent is extended or adjusted under 35 U.S.C. 154(b) by 27 days.

(21) Appl. No.: 15/435,707

(22) Filed: Feb. 17, 2017

(65) Prior Publication Data
US 2017/0240107 A1     Aug. 24, 2017

(30) Foreign Application Priority Data

Feb. 22, 2016   (FR) ..................................... 16 51408

(51) Int. Cl.
*H05B 33/08*    (2006.01)
*B60Q 3/80*    (2017.01)
*B60H 1/00*    (2006.01)

(52) U.S. Cl.
CPC ........... *B60Q 3/80* (2017.02); *B60H 1/00564* (2013.01); *B60H 1/00807* (2013.01); *B60H 1/00985* (2013.01); *H05B 33/0854* (2013.01); *H05B 33/0872* (2013.01); *B60Q 2500/20* (2013.01)

(58) Field of Classification Search
CPC ................ H05B 33/08; H05B 33/0854; H05B 33/0872; B60Q 3/80; B60Q 2500/20; B60H 1/00807; B60H 1/00985; B60H 1/00564
USPC .............. 315/77, 129–134, 185 R, 150–152, 315/224–226, 291, 297, 307, 308, 312
See application file for complete search history.

(56) References Cited

U.S. PATENT DOCUMENTS

| 7,344,277 B2 * | 3/2008 | Anderson, Jr. .... B60H 1/00985 236/49.3 |
| 2017/0158020 A1 * | 6/2017 | Park ................... B60H 1/00585 |

\* cited by examiner

*Primary Examiner* — Jimmy Vu
(74) *Attorney, Agent, or Firm* — Oblon, McClelland, Maier & Neustadt, L.L.P.

(57) ABSTRACT

The invention concerns a device for lighting the passenger compartment of a motor vehicle. The device includes a variable light-emitting element adapted to generate selectively a light beam having at least one variable characteristic, and a device for measuring the ambient temperature in the passenger compartment of the vehicle. A device for controlling the variable light-emitting element is configured to control the emission of the light beam and to vary the variable characteristic of the light-emitting element as a function of the ambient temperature measured by the device for measuring.

9 Claims, 1 Drawing Sheet

DEVICE FOR LIGHTING THE PASSENGER COMPARTMENT OF A MOTOR VEHICLE

BACKGROUND

The present invention concerns a device for lighting the passenger compartment of a motor vehicle.

In the automotive world, manufacturers seek both technical innovations aimed at improving vehicle performance and safety and also technical innovations producing esthetic effects to improve the onboard ambience or style of the vehicle.

Thus there exist lighting devices the effect of which is to set up a particular ambience in the passenger compartment of the vehicle thanks to the intensity or the color of the lighting. Also, some lighting devices provide information on parameters of the vehicle, for example on the dashboard.

For example, in the case of heating and/or air-conditioning systems, there may be a requirement to give an indication of the temperature by means of luminous signals having a specific color. Actually, a display may be used to show the ambient temperature in the passenger compartment, the temperature figure being a certain color when the temperature is high and a different color when the temperature is low.

The document US2007/0046452 describes an improved lighting device that is disposed in a ventilation duct of a heating and/or air-conditioning system, the duct including an opening leading into the passenger compartment of the vehicle, so that the beam is visible to the occupants of the vehicle. This device diffuses light of one specific color, for example red, when the temperature of the duct is above a threshold value and another specific color, for example blue, when the temperature of the duct falls below another threshold value.

However, this device is limited to two colors and two temperature threshold values. The visual perception of temperature given by the lighting device is therefore imprecise. Actually, the temperature value is deduced only at the time of one of the two colors changing or being turned on. If the temperature continues to rise or to fall, the corresponding lighting color remains the same.

BRIEF SUMMARY

The object of the invention is to remedy this drawback and to provide a lighting device capable of varying the lighting as a function of a multitude of measured temperatures in order for an observer to perceive the temperature difference visually, even if the difference varies only slightly.

To this end, the invention relates to a device for lighting the passenger compartment of a motor vehicle, including variable light-emitting means adapted to generate selectively a light beam having at least one variable characteristic, means for measuring the ambient temperature in the passenger compartment of the vehicle, and means for controlling said variable light-emitting means, the control means being configured to control the emission of said light beam and to vary said variable characteristic of the light-emitting means as a function of the ambient temperature measured by the measuring means.

Thus the lighting effect of the light beam can be varied to produce, for example, a different color or intensity for a multitude of different measured temperatures. The perceived lighting effect therefore indicates the ambient temperature to a person in the passenger compartment.

The device may notably be used in a ventilation air duct of a vehicle heating and/or air-conditioning system so that the light exits the duct so as, thanks to a specific lighting effect, to indicate the temperature of the air flowing in the duct and that is intended for the passenger compartment.

According to different embodiments of the invention, separately or in combination:
- the variable characteristic or characteristics may notably be the color, the intensity or the modulation of the intensity of the light beam,
- the light-emitting means are configured to generate at least a first light beam at a first wavelength and a second light beam at a second wavelength, the control means being configured to combine the emission of the first and second light beams and to vary their respective intensity so as to modify the lighting effect,
- the light-emitting means and/or the control means are arranged with the ambient temperature measuring means on the same integrated circuit support in order to obtain a compact module that is easy to install, for example in a motor vehicle,
- the light-emitting means and the control means are arranged with the ambient temperature measuring means on the same integrated circuit support,
- the light-emitting means include a first light source configured to emit the first wavelength and a second light source configured to emit the second wavelength,
- the first source is a light-emitting semiconductor chip,
- the second light source is a light-emitting semiconductor chip,
- the light-emitting semiconductor chip or chips is or are light-emitting diodes,
- the light-emitting means may include a single light source, notably a single light-emitting semiconductor chip,
- the first wavelength is different from the second wavelength, the first wavelength corresponding to a first color and the second wavelength corresponding to a second color,
- the light-emitting means include a third light source, notably a third light-emitting semiconductor chip, configured to emit a third wavelength corresponding to a third color,
- the light-emitting means include an RGB type light-emitting diode that includes the first, second and third chips,
- the measuring means include a thermistor the resistance of which varies as a function of temperature,
- the thermistor has a positive temperature coefficient,
- the thermistor has a negative temperature coefficient,
- the control means include a central processing unit,
- the measuring means include a thermistor of the NTC type the resistance of which varies as a function of temperature,
- the control means include a CPU type central processing unit,
- the control means are configured to vary the luminous intensity of the light-emitting means,
- the device includes a casing, the light-emitting means, the measuring means and the control means being disposed together in the casing,
- the variation of the characteristic variable as a function of the ambient temperature is a function exclusively of the temperature measured by the measuring means,
- the device may include a single connector to supply electrical power to the device, the device has no data input/output interface, in particular for data relating to an ambient temperature of the passenger compartment, for example acquired by external measuring means.

The invention also relates to a motor vehicle heating and/or air-conditioning system including a duct designed to circulate a flow of air and a variable illumination lighting device.

According to various embodiments of the invention, separately or in combination:
- the device is disposed so that the measuring means can measure the temperature of the air issuing from the heating and/or air-conditioning system,
- the device is disposed in the duct, the measuring means therefore measuring the temperature of the air flowing in the duct,
- the duct includes an opening designed for the flow of air to exit to the passenger compartment of the vehicle,
- the device is disposed around the duct, for example around the opening of the duct, the measuring means measuring the temperature of the air issuing from the duct or the temperature of the air at the level of the opening of the duct,
- the device is preferably arranged in the vicinity of the opening, for example, so that the light beams can be emitted toward the passenger compartment, notably via said opening,
- the device may be arranged so that the light beams can be emitted into the passenger compartment through the opening,
- the device may be arranged so that the light beams can be emitted toward the passenger compartment around the opening.

BRIEF DESCRIPTION OF THE DRAWINGS

The invention will be better understood in the light of the following description given by way of nonlimiting indication only and accompanied by the appended drawings, in which.

DETAILED DESCRIPTION

Figure 1:
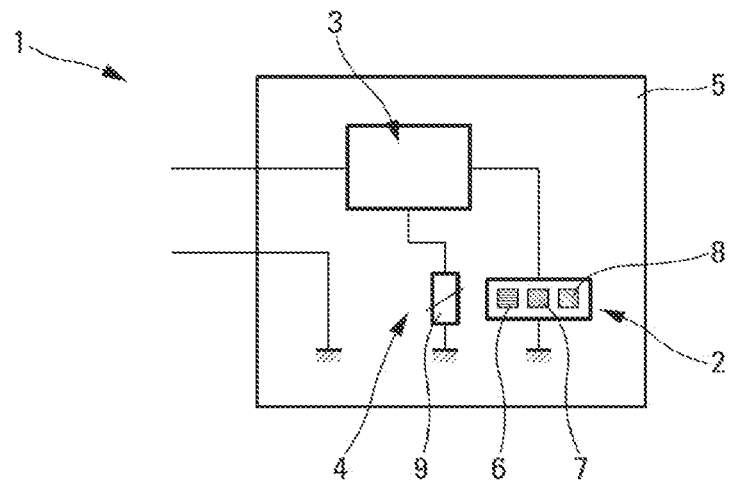
FIG. 1 is a diagrammatic illustration of a variable illumination lighting device.

As shown in FIG. 1, the variable illumination lighting device 1 for a motor vehicle passenger compartment includes variable light-emitting means 2, means 4 for measuring the ambient temperature in the passenger compartment of the vehicle and means 3 for controlling the variable light-emitting means 2, arranged here on the same integrated circuit support, of PCB (printed circuit board) type. The device 1 includes for example a casing (not represented in the figures), the light-emitting means 2, the measuring means 4 and the control means 3 being disposed together in the casing. The device 1 may include a single connector to supply electrical power to the device 1.

The variable light-emitting means 2 are adapted to generate selectively a light beam having at least one variable characteristic. The variable characteristic or characteristics may notably be the color, the intensity or the modulation of the intensity of the light beam.

The light-emitting means 2 preferably include a first light source 6 configured to emit a first light beam at a first wavelength, a second light source 7 configured to emit a second light beam at a second wavelength, and a third light source 8 configured to emit a third light beam at a third wavelength. The three wavelengths are advantageously different from one another. Light-emitting semiconductor chips, notably light-emitting diodes, are preferably used as the sources 6, 7, 8. Here the first source 6 emits a red beam, the second source 7 emits a green beam and the third source 8 emits a blue beam to form a light-emitting diode of RGB type ("red/green/blue" in English) or RVB type (rouge/vert/bleu in French), and which includes the first, second and third chips. A diode of this kind makes it possible to generate a lighting effect using substantially all visible colors.

The means 3 controlling the light-emitting means here include a central processing unit of CPU type. The control means 3 are connected to an electrical power supply external to the device 1.

The control means 3 are individually connected to each diode 6, 7, 8 of the light-emitting means 8 so as to be able to actuate them separately. The control means 3 can therefore combine the first, second and third light beams and vary their respective intensity. The mixing of the three wavelengths of the three beams therefore makes it possible to modify the color of the lighting effect generated by the device 1. A lighting element of RGB type is able to generate substantially all the colors of the visible spectrum.

According to the invention, the control means 3 are configured to control the emission of the light beams by varying said variable characteristic as a function of the ambient temperature measured by the measuring means. Here the color of the lighting is modified as a function of the ambient temperature by varying the intensity of each of the light beams. Here the ambient temperature is the temperature of the environment of the integrated circuit support 5. In other words, it is the temperature of the air around the printed circuit board 5. To this end, the control means 3 are connected to the temperature measuring means 4 to determine the color that the light-emitting means 2 will generate.

Accordingly, the variation of the characteristic variable as a function of the ambient temperature is exclusively a function of the temperature measured by the measuring means. The device 1 notably has no data input/output interface, in particular for data relating to an ambient temperature of the passenger compartment, for example acquired by external measuring means.

Here the measuring means 4 include a thermistor 9 the resistance of which varies as a function of the ambient temperature and that is preferably of the NTC (negative temperature coefficient) type. Accordingly, the control means 3 calculate the ambient temperature using the value of the resistance of the thermistor 9. In an alternative embodiment the thermistor may have a positive temperature coefficient.

The control means 3 are programmed to control the specific color of the light generated by the light-emitting means 2 as a function of a multitude of different measured temperatures. The control means 3 are preferably programmed to command colors of light over a wide spectrum of light visible to the human eye. The control means 3 are preferably configured to order colors of light, which may be any color of the spectrum visible to the human eye. Each specific color is moreover different from the other specific colors corresponding to other measured temperature values. Accordingly, the ambient temperature can be deduced from the color of the light generated by the light-emitting means 2.

The control means 3 are further configured so that a specific color corresponds to a continuous range of measured temperature values. In other words, there is a band of values around a given temperature over which the specific color remains the same. The color changes only when the value of the temperature has exceeded the value of this band, i.e. is no longer within this range. For example there may be a band of 0.5° C. between changes of color.

For example, the variation of the color of the light beam may be substantially continuous and/or progressive over the visible light spectrum to go from so-called "cold" colors, such as blue or green, for lower temperatures, to so-called "warm" colors, such as red or yellow, for high temperatures.

In a second embodiment, the control means are configured to vary only the luminous intensity of the light from the light-emitting means as a function of temperature. In other words, the device does not modify the color but rather the intensity of the lighting as a function of temperature.

In a third embodiment, the control means are configured to vary the luminous intensity and the color of the light from the light-emitting means as a function of temperature. The color and the intensity may be varied simultaneously or consecutively, depending on the configuration of the control means.

Figure 2:
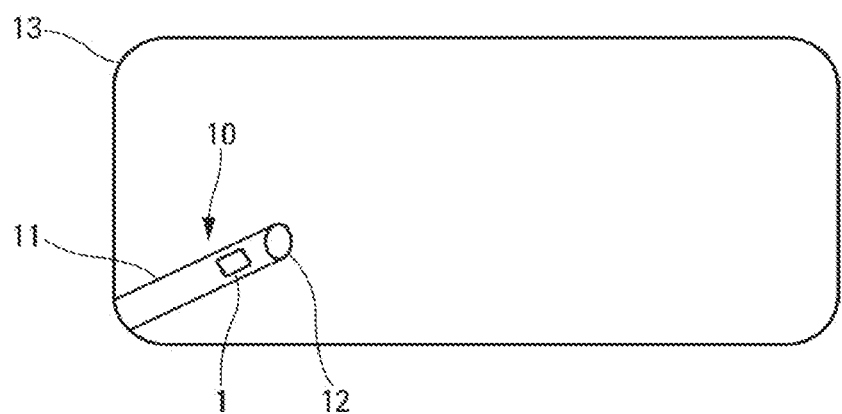
FIG. 2 is a diagrammatic illustration of a motor vehicle heating and/or air-conditioning system fitted with a variable illumination lighting device.

In FIG. 2, the variable illumination lighting device 1 described above is arranged in a motor vehicle ventilation system, for example a heating and/or air-conditioning circuit 10. The device 1 is disposed so that the measuring means 4 can measure the temperature of the air issuing from the heating and/or air-conditioning system. The heating and/or air-conditioning system 10 includes for example an air flow feed duct 11 that leads into the passenger compartment 13 of the vehicle via an opening 12 for the flow of air to exit toward the passenger compartment. The lighting device 1 is disposed in the duct 11 so that the measuring means are able to measure the temperature of the flow of air circulating in the duct. The lighting device is preferably arranged in the vicinity of the opening 12 of the duct so that the light beams can pass at least in part through said opening 12 so as to be emitted toward the passenger compartment 13 of the vehicle. The device 1 is preferably arranged so that the light beams can be emitted into the passenger compartment 13 through the opening 12.

In a variant that is not represented in the figures the device is disposed around the duct, for example around the opening of the duct, the measuring means measuring the temperature of the air issuing from the duct or the temperature of the air at the level of the opening of the duct. The device may be arranged so that the light beams can be emitted toward the passenger compartment around the opening.

The heating and/or air-conditioning system further includes a heating and/or air-conditioning circuit that is not represented in the figures and that makes it possible to feed a flow of air into the duct at the selected temperature. The lighting device 1 is arranged so that the measuring means are substantially in the flow of air and can measure its temperature.

Thanks to the invention, the device 1 generates light the color of which varies as a function of the temperature of the flow of air circulating in the duct 11. The occupant or occupants of the vehicle therefore observe(s) light of a specific color for a multitude of different temperatures of the flow of air circulating in the duct 11. This therefore makes it possible to perceive visually the temperature generated by the heating and/or air-conditioning system and to have a particular ambience when that temperature is selected by the user for the heating and/or air-conditioning system.

The colors are for example distributed for temperature values ranging from 10° C. to 35° C. A particular color is for example generated over a temperature band of the order of 0.5° C. around a fixed temperature, or even 0.2° C. The band may be larger or smaller, depending on the capabilities of the control means and the required degree of variation of the lighting.

Moreover, as the components of the device are arranged on the same integrated circuit support, there is no need for additional temperature sensors arranged in the heating and/or air-conditioning system.

The invention claimed is:

1. A device for lighting the passenger compartment of a motor vehicle, comprising:
    variable light-emitting means adapted to generate selectively a light beam having at least one variable characteristic,
    means for measuring the ambient temperature in the passenger compartment of the vehicle, and
    means for controlling said variable light-emitting means,
    wherein the control means are configured to control the emission of said light beam and to vary said variable characteristic of the light-emitting means as a function of the ambient temperature measured by the measuring means,
    wherein the light-emitting means are configured to generate at least a first light beam at a first wavelength and a second light beam at a second wavelength, the control means being configured to combine the emission of the first and second light beams and to vary their respective intensity to modify the lighting effect.

2. The lighting device according to claim 1, wherein the light-emitting means and the control means are arranged with the ambient temperature measuring means on the same integrated circuit support.

3. The lighting device according to claim 1, wherein the first wavelength is different from the second wavelength, the first wavelength corresponding to a first color and the second wavelength corresponding to a second color.

4. The lighting device according to claim 1, wherein the light-emitting means include a first light source, notably a first light-emitting semiconductor chip, configured to emit the first wavelength and a second light source, notably a light-emitting semiconductor chip, configured to emit the second wavelength.

5. The lighting device according to claim 4, wherein the light-emitting means include a third light source, notably a third light-emitting semiconductor chip, configured to emit a third wavelength corresponding to a third color.

6. The lighting device according to claim 1, wherein the measuring means include a thermistor and a resistance of the thermistor varies as a function of temperature.

7. The lighting device according to claim 1, wherein the control means include a central processing unit.

8. A motor vehicle heating and/or air-conditioning system, comprising:
    a duct to circulate a flow of air, and
    the lighting device according to claim 1, the device being disposed so that the measuring means measures the temperature of the air issuing from the heating and/or air-conditioning system.

9. The according to claim 8, wherein the duct includes an opening for the exit of the flow of air into the passenger compartment of the vehicle, the device being arranged in the vicinity of the opening, so that the light beams are being emitted toward the passenger compartment, notably via said opening.

\* \* \* \* \*